United States Patent [19]

Puskas et al.

[11] 3,974,131

[45] Aug. 10, 1976

[54] AZIRIDINE MONOMERS AND COPOLYMERS

[75] Inventors: Joseph Emil Puskas, Yardville; William J. Shibe, Jr.; William Wood, both of Moorestown, all of N.J.

[73] Assignee: Sybron Corporation, Rochester, N.Y.

[22] Filed: Feb. 14, 1975

[21] Appl. No.: 550,166

[52] U.S. Cl. ............................ 526/263; 260/30.4 N; 260/31.4 R; 260/31.8 R; 260/32.8 N; 260/33.6 UA; 260/42.52; 260/239 R; 260/895; 526/328; 428/463
[51] Int. Cl.² ................ C08F 220/34; C08F 226/02
[58] Field of Search .................... 260/80.72, 86.1 N; 450/725, 723

[56] References Cited
UNITED STATES PATENTS

| | | | |
|---|---|---|---|
| 3,413,272 | 11/1968 | Rees ................................ | 260/78.5 |
| 3,448,094 | 6/1969 | Zief et al. ......................... | 260/86.1 |
| 3,480,601 | 11/1969 | Ashby et al. ..................... | 260/86.1 |
| 3,719,646 | 3/1973 | Stecklen et al. ................. | 260/80.72 |

*Primary Examiner*—Stanford M. Levin
*Attorney, Agent, or Firm*—Theodore B. Roessel; Papan Devnani

[57] ABSTRACT

A group of new monomers containing aziridinyl functionality as well as unsaturated carbon to carbon bonds are synthesized by addition of alkylenimine to propenic acid esters of polyhydroxy compounds in controlled quantities. The monomers readily form copolymers with other monomers and find use as adhesion promoters in vinyl formulations.

7 Claims, No Drawings

AZIRIDINE MONOMERS AND COPOLYMERS

BACKGROUND OF THE INVENTION

This invention relates to a new group of monomer compounds containing aziridinyl group substituted esters; its derivatives and the method of their production.

OBJECTS OF THE INVENTION

It is the object of the invention to provide a novel aziridinyl monomer, as a building block for homopolymers and copolymers. It is another object of the invention to provide a method for preparing aziridinyl monomer, copolymers and homopolymers.

It is still another object of the invention to provide an adhesion promoter for vinyl formulations to enable them to bond to other substrates, without discoloring the vinyl compound under heat.

It is a further object of the invention to provide a reactive monomer having aziridinyl functionality.

It is still further object of the invention to provide an aziridinyl monomer which could be copolymerized with acrylic acid ester monomers, methacrylic acid ester monomers and other monomers.

BRIEF SUMMARY OF THE INVENTION

These objects are accomplished in accordance with the invention by the provision of unsaturated aziridinyl esters of the following general formula:

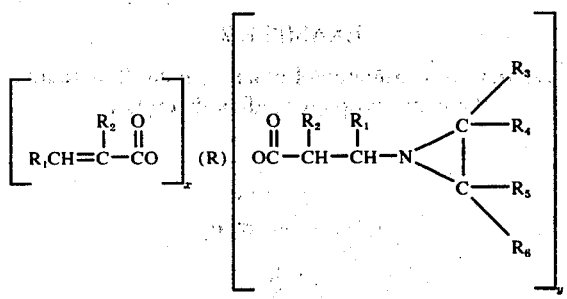

wherein $R = -(R_7)_z C(CH_2)_{4-z}$ where $R_7 = C_{1-5}$ alkyl group
$z = 0, 1, 2$ or $R = -(CH_2-CH-O)_z-CH_2-CH-$ where $R_8 = H$ or $C_{1-5}$ alkyl group
         $|$                    $|$
         $R_8$                  $R_8$
$z = 1-9$ or $R = -(CH_2-CH)_z-$ where $R_9 = H, C_{1-5}$ alkyl group
       $|$
       $R_9$
$z = 1-6$ $R_1$ — hydrogen or $C_{1-5}$ alkyl group
$R_2$ — hydrogen or $C_{1-5}$ alkyl group
$R_3$ — hydrogen or $C_{1-5}$ alkyl group
$R_4$ — hydrogen or $C_{1-5}$ alkyl group
$R_5$ — hydrogen or $C_{1-5}$ alkyl group
$R_6$ — hydrogen or $C_{1-5}$ alkyl group
$x = 1, 2,$ or $3$
$y = 1, 2,$ or $3$
$x + y = 2$ to $4$ Other objects and further scope of applicability of the present invention will become apparent from the detailed description given hereinafter; it should be understood however that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE INVENTION

Bestian in U.S. Pat. No. 2,596,200 describes a compound containing aziridinyl group. The compound is made by the addition of $\alpha\beta$-alkylenimines to $\alpha\beta$-olefin carboxylic acid esters of polyhydric alcohols and is saturated. To ensure saturation and to cause a faster reaction excess of alkylenimine is added. An important feature of the present invention lies in adding alkylenimine to propenic acid esters of polyhydroxy compounds in such controlled quantity so as to maintain the end product unsaturated by not reacting all the vinyl groups in the ester. This resulting product is a monomer containing both an aziridinyl group as well as unsaturated carbon to carbon bonds.

The monomers of this invention are prepared by Michael's addition of alkylenimine to one or more of the vinyl groups available in various propenic acid esters of polyhydroxy compounds. The number of moles of alkylenimine added to the ester is always one or more less than the number of propenic acid groups present.

The propenic acid esters may be prepared from various glycols or polyhydroxy compounds of the following structure:

A. $R_xC(CH_2OH)_{4-x}$
   Where $x = 0, 1, 2$ $R$ = lower alkyl where C is 1 through 5
B. $HO(CH_2CHO)_xH$
         $R$
   Where $x = 1 - 10$
   $R = H$, lower alkyl -continued C. $HO(CH_2CH)_xOH$
   $R$
   x = 1 to 6
   R = lower alkyl, H The propenic acid utilized may have the following structure:

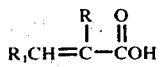

$$R_1CH=\underset{R}{C}-\underset{O}{\overset{\|}{C}}OH$$

Where R is H or lower alkyl
$R_1$ is H or lower alkyl
The alkylenimine utilized in the preparation of novel monomers have the following general structure:

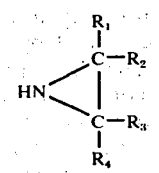

$R_1$ through $R_4$ is hydrogen or lower alkyl radical.

The aziridinyl monomers of the general formula are used as building blocks. With other monomers they form comonomers which are polymerized and find use as adhesion promoters. Suitable material for use as monomers among others include: butyl acrylate, ethyl acrylate, isobutyl acrylate, ethyl methacrylate, butyl methacrylate, isobutyl methacrylate, isodecyl methacrylate, lauryl methacrylate and tridecyl methacrylate. However the invention is not limited to the use of acrylic acid esters and methacrylic acid esters only. Other comonomers which may effectively be utilized are vinyl acetate, acrylamide, methacrylamide, methacrylonitrile, acrylonitrile, vinyl toluene, α-methyl styrene, and styrene. Copolymers containing aziridinyl monomer in the range of about 5 to 60% by weight are found more suitable as adhesion promoters. Percentages of aziridinyl monomer less than about 5% do not possess adhesion promoting properties and precentages over about 60% are uneconomical.

BRIEF DESCRIPTION OF PREFERRED EMBODIMENT:

The advantages of the improved adhesion properties of aziridinyl compounds will become apparent upon consideration of the following disclosure of the invention; especially when taken in conjunction with the accompanying examples wherein Example 1–8 show preparation of various monomers conforming to the general formula using different glycols. Examples 9–12 show preparation of copolymers with the aziridinyl monomers of this invention. Example 13 shows the use of this copolymer as adhesion promoter.

EXAMPLE 1

Preparation of Aziridinyl Monomer

Trimethylol propane bis-2-(1-aziridinyl) propionate mono acrylate is prepared by the addition of 2 mol ethylenimine to 1 mol of trimethylol propane triacrylate.

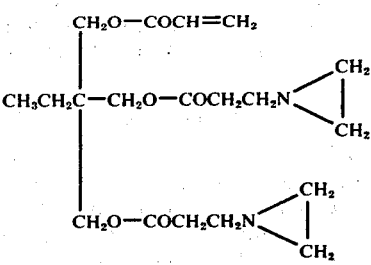

$x = 1$ $y = 2$ $x + y = 3$

Glycol: Trimethylolpropane, imine = ethylenimine 0.5 mol (148 gms) trimethylol propane triacrylate and 90 gms. Dioxane is charged into a 500 ml 3-neck flask fitted with agitator, thermometer, addition funnel and condenser. The reaction is cooled to 20°C. and 1 mol (43 gms) ethylenimine is added dropwise, keeping the temperature below about 30°C with a cooling bath. The addition requires about 40 minutes after which the cooling bath is removed and the reaction allowed to exotherm to a max. of 35°C., then heated to about 58°–60°C. over about 1 hour. The reaction is cooled to room temperature. The yield of product calculated from aziridine titration is 67%.

EXAMPLE 2

Preparation of trimethylol ethane (mono-2-aziridinyl 1-methyl propionate)dimethacrylate

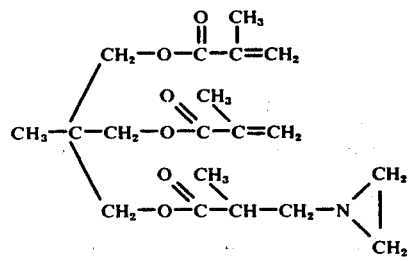

Mol. Wt. : 367

$x = 2$, $y = 1$, $x+y = 3$ glycol = trimethylolethane
imine: ethyleneimine 0.5 mole (162g) trimethylol ethane trimethacrylate and 90 g dioxane is charged into a 500 ml 3-neck flask described in example 1. The flask is cooled to 20°C and 0.5 mole (21.5 g) ethylenimine is added dropwise over 40 minutes keeping the reaction temperature below 30°C. After the ethylenimine addition is completed, the temperature is permitted to rise to 35°, and when the exotherm subsides, the temperature is raised over approximately one hour period to 60°C. The batch is then cooled. The yield of product calculated from aziridine titration 99%.

EXAMPLE 3

Preparation of pentaerythritol (di-2-aziridinyl-2-methyl propionate)monocrotonate

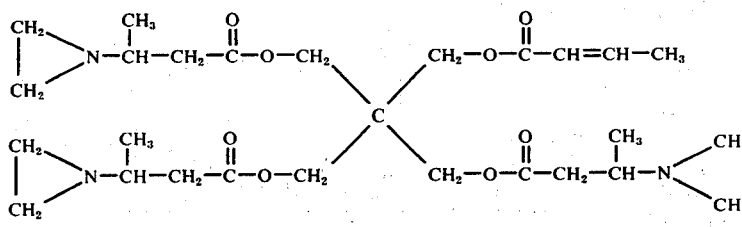

Mol. Wt.: 537

$x = 1, y = 3, x+y = 4$
glycol: pentaerythritol
imine: ethylenimine 0.25 mole (102 g) pentaerythritol tetracrotonate and 52 g dioxane is charged into equipment described in Example 1. The solution is neutralized with a few drops of triethylamine. One gram of sodium methylate is added and then 0.83 mole (35.5 g) ethylenimine (10% excess) added dropwise over 30 minutes. No temperature increase will be obtained. After the ethylenimine addition is completed, the reaction temperature is raised to 65°C and maintained for 9 hours. The batch temperature is then lowered to 60°C, and vacuum applied (100 mm Hg) for 15 minutes to remove excess ethylenimine. The yield of product calculated from aziridine titration, 81%.

EXAMPLE 4

Preparation of pentaerythritol diacrylate di-2-aziridinyl propionate

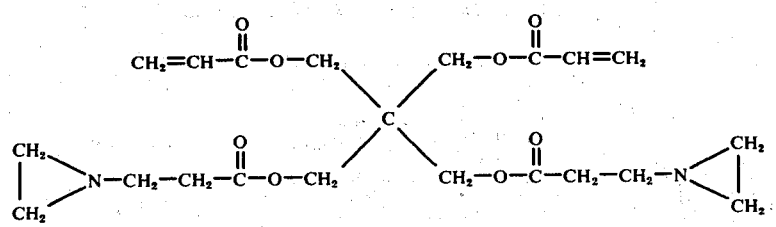

Mol. Wt.: 438

$x = 2, y = 2, x+y = 4$
glycol = pentaerythritol
imine = ethylenimine 0.25 (88 g) pentaerythritol tetraacrylate and 50 g dioxane is charged into equipment described in Example 1. The solution is cooled to 25°C. and 0.5 moles (21.5 g) ethylenimine is added dropwise over 30 minutes keeping the temperature at 40°C. The reaction temperature is raised to 70°C over 35 minutes and maintained for 3 hours. The batch is then cooled. The yield of product calculated from aziridine titration, 70%.

EXAMPLE 5

Preparation of diethylene glycol monoacrylate mono-2-aziridinyl propionate

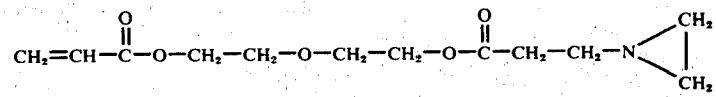

Mol. Wt.: 257

$x = 1, y = 1, x+y = 2$
glycol = diethylene glycol
imine = ethylenimine 0.5 moles (107 g) diethylene glycol diacrylate and 50 g benzene is charged into equipment described in Example 1. The solution is cooled to 20°C. and 0.5 moles (21.5 g) ethylenimine is added dropwise over 30 minutes. The reaction temperature is maintained between 25°–30°C. After all the ethylenimine had been added, the reaction temperature is maintained at 30°C for 1 hour. The temperature is then raised to reflux (80°C) and held for 2 hours. The benzene is removed by distillation at 80°C under 100 mm mercury. The product is cooled and clarified from a small amount of white precipitate by filtration. The yield of product calculated from aziridine titration, 91.5%.

EXAMPLE 6

Preparation of tripropylene glycol monomethacrylate mono-2-aziridinyl 1-methyl propionate

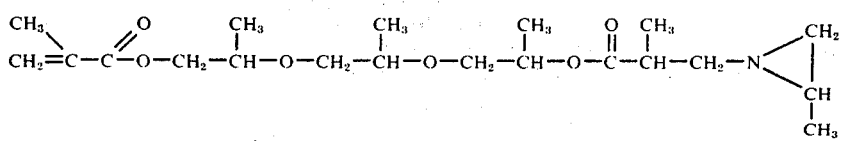

Mol. Wt. : 385

$x = 1, y = 1, x+y = 2$
glycol = tripropylene glycol
imine = propylenimine 0.5 mol (164 g) of tripropylene glycol dimethacrylate 0.5 mol (28.5g) propylenimine and 2 gms of sodium methoxide are utilized and the abovementioned compound prepared by the same process as in the Example 5. The yield of product calculated from aziridine titration, 80%.

EXAMPLE 7

Preparation of hexylene glycol monoacrylate mono-2-aziridinyl propionate

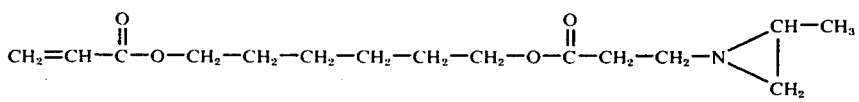

Mol. Wt. : 283

$x = 1, y = 1, x+y = 2$
glycol = hexylene glycol
imine = propylenimine 0.5 moles (113.5 g) of hexylene glycol diacrylate and 0.5 moles (28.5) of propylenimine are utilized and the abovementioned compound prepared by the same process as in example 5. The yield of product calculated from aziridine titration, 90%.

EXAMPLE 8

Preparation of dipropylene glycol monomethacrylate - mono-2-aziridinyl-1-methyl propionate

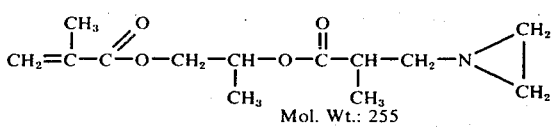

Mol. Wt.: 255

$x = 1, y = 1, x+y = 2$
Glycol = propylene glycol
imine = ethylenimine 0.5 moles (106 g) of propylene glycol dimethacrylate 0.5 moles (21.5 g) ethylenimine and 2 gms of sodium methoxide are utilized and the abovementioned compound prepared by the same process as in example 5. The yield of product calculated from aziridine titration, 82%.

EXAMPLE 9

Preparation of Copolymers

The copolymer is prepared in a 2000 cc resin kettle equipped wit heating mantle, condenser, thermometer, nitrogen purge inlet, and Teflon (Trademark for polytetrafluoroethylene made by duPont) bladed stirrer.

Procedure:
Reactor charge:
| Diisodecyl phthalate (DIDP) | 1052 g. |
| Azobisisobutyronitrile (AIBN) | 2.5 |

The nitrogen purging is started, agitator speed set at 160 rpm, and the batch temperature raised to 90°C. The following mixture of monomers is then added over a two hour period.:

Delay charge:

| Methylmethacrylate (MMA) | 230 g. |
| Butylacrylate (BA) | 115 |
| Trimethylol propane bis-2-(1-aziridinyl) propionate monoacrylate (70%) product of example 1 | 131.4 |
| AIBN | 7.5 |

The reaction temperature is maintained at 90°C., and when the addition of the delayed monomers is completed, the following are added:

| Timethylol propane bis-2-(1-aziridinyl) propionate-monoacrylate 70% product of example 1 | 32.9 g. |
| AIBN | 1 |

An hour later 1 gram of AIBN is added. Another hour later, the temperature is lowered to 85°C., and approximately 28 inches vacuum applied till all volatile matter at this temperature is removed.

Results:
| Appearance | Clear liquid |
| Brookfield Viscosity 60 rpm | 4,000 cps |
| Residual MMA | less than 0.1% |
| Residual BA | less than 0.1% |
| trimethylol propane bis-2(1-aziridinyl) propionate- mono acrylate in polymer determined by aziridine titration | 25% |

EXAMPLE 10

Preparation of copolymer using cellosolve acetate as solvent in place of DIDP.

The equipment used is the same as in example 9.

Procedure:
Reactor charge:
| Cellosolve acetate | 500 g. |

| | |
|---|---|
| AIBN | 1.0 |

The CO₂ purging is started, agitator speed set at 160 rpm, and the batch temperature raised to 90°C. The following mixture of monomers is then added over a two hour period:

| | |
|---|---|
| Delay charge: | |
| MMA | 142 g. |
| 2-Ethylhexylacrylate (2-EHA) | 70 |
| Azridinyl Product of Example 1 (70%) | 76 |
| AIBN | 5 |

The reaction temperature is maintained between 90°–95°C. and when the addition of the delayed monomers is completed, the following are added:

| | |
|---|---|
| Aziridinyl product of Example 1 (70%) | 16 g. |
| AIBN | 2 |

Half an hour later one gram AIBN is added followed by 1.5 g. AIBN another half hour later.

| Results: | |
|---|---|
| Solids Theoretical | 35.2% |
| Determined | 34.2% |
| Residual MMA | 0.5% |
| Residual 2-EHA | 0.5% |
| Aziridinyl monomer of Example 1 in polymer determined by aziridine titration | 23.0% |
| Brookfield Viscosity 60 rpm | 27 cps |

EXAMPLE 11

Preparation of copolymer using xylene as solvent in place of DIDP.

A 500 ml reactor is used equipped in the same manner as the one in example 10.

| Procedure: | |
|---|---|
| Reactor charge: | |
| Xylene | 250 g. |
| AIBN | 0.5 |

Polymerization is carried out in the same manner as in Example 2 except the following monomer mix is used:

| | |
|---|---|
| Delay charge: | |
| MMA | 71 g. |
| 2-EHA | 35 |
| Aziridinyl product of Example 1 70% | 38 |
| AIBN | 2.3 |

When the addition of delayed monomers is completed, eight grams of azirdinyl product of example 1 and 0.5g. AIBN are added. An hour later, the batch is cooled.

| Results: | |
|---|---|
| Solids Theoretical | 34.9% |
| Determined | 34.5% |
| Residual MMA | 0.61% |
| Residual 2-EHA | 1.88% |
| Aziridinyl product of Example 1 in polymer determined | 20.4% |

EXAMPLE 12

Preparation of copolymer using high ratio of aziridinyl monomer to acrylates

The procedure is exactly the same as for example 10 except the delay charge and chaser monomer are modified as follows:

| | |
|---|---|
| Delay charge: | |
| MMA | 80.4g |
| 2-EHA | 39.6 |
| Aziridinyl Product of Example 1 (70%) | 152.0 |
| AIBN | 5.0 |
| Chaser monomer | |
| Aziridinyl monomer of example 1 (70%) | 32 g. |
| Results: | |
| Solids Theoretical | 31.7% |
| Determined | 32.5% |
| Residual MMA | 0.1% |
| Residual 2-FHA | 0.5% |
| Aziridinyl product of Example 1 (70%) by aziridine titration | 4.2% |

Thus, Example 9 shows that aziridinyl monomers can be copolymerized with other vinyl monomers. Examples 10 and 11 illustrate the use of different solvents, and the example 12 shows that higher aziridinyl ratio can be used.

Alternate solvents which may be utilized in the copolymerization include esters, ethers, ketones, aliphatic, and aromatic solvents. Specific examples for each group are cellosolve acetate, dioxane, cyclohexanone, xylene, hexane, and toluene. These solvents are unreactive organic solvents having boiling point of at least 90°C or higher.

In the preferred embodiment the aziridinyl monomer trimethylol propane bis-2-(1-aziridinyl) propionate monoacrylate (preparation shown in example 1) is copolymerized with other acrylate monomers as shown in Example 13.

EXAMPLE 13

A polymer is prepared as 27% solids solution in diisodecylphthalate (DIDP) as it is used as an adhesion promoter in this form.

The product is prepared in a 500 cc resin kettle equipped with heating mantle, condenser, thermometer, nitrogen purge inlet, and Teflon bladed stirrer.

| Kettle Charge: | |
|---|---|
| Di-isodecyl phthalate | 250 cc. |
| AIBN | 0.5 g. |

The nitrogen purging is started, agitation set at 180 rpm, and batch temperature raised to 90°C. When the batch temperature reaches 90°C, the following monomers are added over 2.5 hours:

| | |
|---|---|
| Delay Charge: | |
| MMA | 47 g. |
| 2-EHA, 100 ppm MMHQ | 23 |
| Aziridinyl monomer of example 1 | 25 |
| AIBN | 1.5 |

The reaction temperature is maintained at 90°C and held there 1.25 hours after the delay is added. 5g of aziridinyl monomer of example 1 is then added and 90°C maintained for an hour. The batch is cooled to 80°C, approximately 28 inches vaccum applied for one hour during which time a small amount of $N_2$ is leaked through the system, and then cooled. A clear solution with very slight haze is obtained.

From experience it is found that in order to obtain proper distribution of the functional monomer, the monomers had to be delayed. It is also learned that the residual monomers may be reduced by adding a small portion of the functional monomer after the delayed portion of the monomers are added to the reactor. The final product is vacuum stripped to remove the dioxane which is in the aziridinyl monomer. The final product contained 0.6% total residual monomers.

The adhesion promoting properties of a copolymer containing aziridinyl monomer are tested by incorporating such copolymer in a polyvinylchloride (PVC) powder coating formula such as follows:

| Reagent | Description | Wt. in Grams |
|---|---|---|
| Geon 140X31 | PVC Homopolymer Resin | 100.00 |
| Ferro 5612 | Barium-Cadmium Stabilizer | 8.00 |
| DIDP | Plasticizer | 39.25 |
| Drapex 6.8 | Epoxy Stabilizer/plasticizer | 10.00 |
| RA-40 | Titanium Dioxide | 2.00 |
| Compound of Example 9 | 27% solution of DIDP | 0.75 |
| SCC-20 | PVC Homopolymer Resin | 5.00 |

A dryblend powder mix of the above formula is made in a blender and cooled. The vinyl coating mix freshly prepared as well as one aged 6 weeks at room temperature are applied to Bonderite 37 treated steel panels for adhesion testing and color development on heating. The coatings are cured at 450°F for 5 minutes. Adhesion is measured on the Dillon Universal Testing Machine by the 180° peel test (ASTM D903-49). Heat stability is measured by the degree of color development in coatings observed at 10-minute time intervals at 350°F. Variations of the dryblend vinyl coating formula containing different amounts of copolymer, from 0 to 9 gms keeping amounts of other ingredients constant are tested. It is concluded that addition of aziridinyl based copolymers improves adhesion of PVC powder to steel and that adhesion increases with increasing amount of copolymer in the formula and the vinyl compound is not discolored. Tests are conducted with vinyl plastisols which confirm the same results.

All these aziridine monomers and copolymers have utility as adhesion promoters.

Thus, it should be appreciated that the present invention accomplishes its intended objects in providing a unique aziridinyl monomer which by itself and on copolymerizing with other monomers acts as an adhesion promoter. Although specific components proportions and procedures have been stated in the above description of the preferred embodiments of the novel adhesion promoting compound, other suitable materials and procedures such as those described above may be employed to synergize, enhance or otherwise modify the novel method. Other modifications and ramifications of the present invention would appear to those skilled in the art upon a reading of this disclosure. These are intended to be included within the scope of this invention.

We claim:

1. A copolymer composition comprised of free radical polymerized aziridinyl monomer of the following structure:

$$\left[ R_1CH=\overset{R_2}{\underset{}{C}}-\overset{O}{\underset{}{C}}O \right]_x (R) \left[ O\overset{O}{\underset{}{C}}-\overset{R_2}{\underset{}{C}}H-\overset{R_1}{\underset{}{C}}H-N\diagup^{C\diagup^{R_3}_{R_4}}_{C\diagdown^{R_5}_{R_6}} \right]_y$$

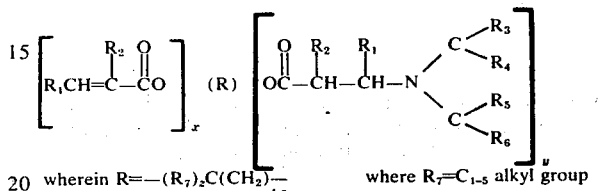

wherein $R=-(R_7)_2C(CH_2)_{\overline{4-z}}$ where $R_7=C_{1-5}$ alkyl group
$z=0, 1, 2$ or
$R=-(CH_2-\underset{R_8}{\underset{|}{C}}H-O)_z-CH_2-\underset{R_8}{\underset{|}{C}}H-$ where $R_8=H$ or $C_{1-5}$ alkyl group
$z=1-9$

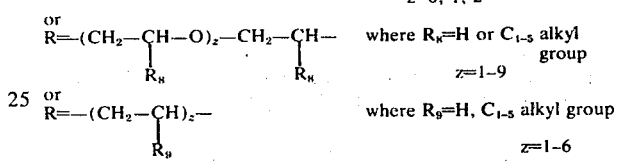

or
$R=-(CH_2-\underset{R_9}{\underset{|}{C}}H)_z-$ where $R_9=H, C_{1-5}$ alkyl group
$z=1-6$ $R_1$— hydrogen or $C_{1-5}$ alkyl group
$R_2$— hydrogen or $C_{1-5}$ alkyl group
$R_3$— hydrogen or $C_{1-5}$ alkyl group
$R_4$— hydrogen or $C_{1-5}$ alkyl group
$R_5$— hydrogen or $C_{1-5}$ alkyl group
$R_6$— hydrogen or $C_{1-5}$ alkyl group
$x = 1, 2,$ or $3$
$y = 1, 2,$ or $3$
$x + y = 2$ to $4$
with ethenically unsaturated monomers.

2. The copolymer composition according to claim 1 which comprises:
   a. an acrylic acid ester monomer,
   b. a methacrylic acid ester monomer and
   c. an aziridinyl monomer as defined in claim 1.

3. The copolymer composition of claim 2 wherein the acrylic acid ester monomer is butyl acrylate and the methacrylic acid ester monomer is methyl methacrylate.

4. The copolymer composition of claim 2 wherein the aziridinyl monomer is trimethylol propane bis-2-(1-aziridinyl) propionate monoacrylate.

5. The copolymer composition of claim 2 wherein the acrylic acid ester monomer is 2-ethylhexyl acrylate and the methacrylic acid ester monomer is methyl methacrylate.

6. The composition of claim 2 wherein the aziridinyl monomer is approximately 5–60% by weight of the copolymer.

7. A copolymer composition which comprises methyl methacrylate 2-ethylhexyl acrylate, and trimethylol propane bis-2-(1-aziridinyl) propionate monoacrylate.

* * * * *

UNITED STATES PATENT AND TRADEMARK OFFICE
CERTIFICATE OF CORRECTION

PATENT NO. : 3,974,131
DATED : August 10, 1976
INVENTOR(S) : Joseph Emil Puskas et al Page 1 of 2

It is certified that error appears in the above-identified patent and that said Letters Patent are hereby corrected as shown below:

Col. 2, line 67, "B." should read $HO(CH_2 CHO)_x H$ $$\begin{array}{c} R \end{array}$$

Where $x = 1-10$
$R = H$, lower alkyl

Col. 10, line 23, "2-FHA" should be -- 2-EHA --.

Col. 10, line 24, "4.2%" should be -- "48.2% --.

Claim 1, formula should be as follows:

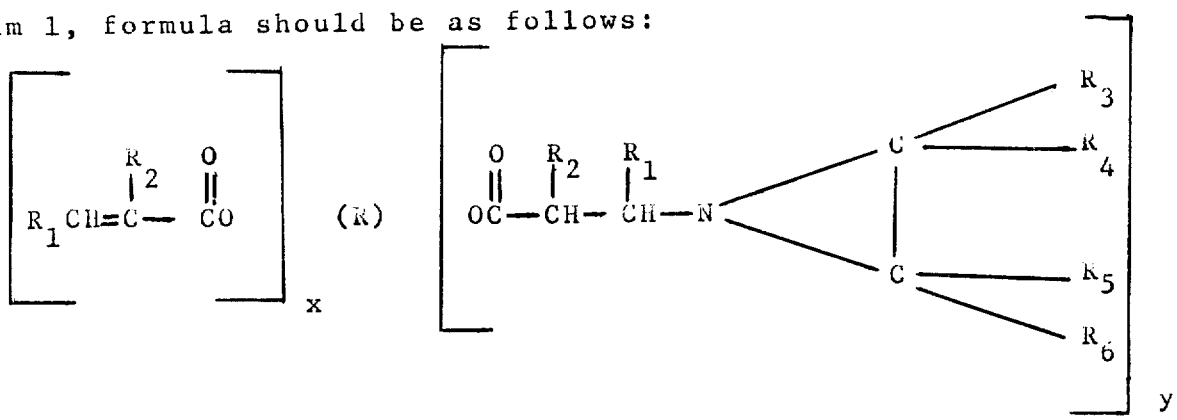

wherein $R = -(R_7)_z C(CH_2)_{4-z}$ where $R_7 = C_{1-5}$ alkyl group $z = 0, 1, 2$ or

UNITED STATES PATENT AND TRADEMARK OFFICE
CERTIFICATE OF CORRECTION

PATENT NO. : 3,974,131

DATED : August 10, 1976

INVENTOR(S) : Joseph Emil Puskas et al

It is certified that error appears in the above-identified patent and that said Letters Patent are hereby corrected as shown below:

$$R = -(CH_2-CH-O)_z-CH_2-CH- \atop \phantom{xxxxxx}R_8 \phantom{xxxxxxx} R_8$$

where $R_8$ = H or $C_{1-5}$ alkyl group $z = 1-9$ or $$R = -(CH_2-CH)_z \atop \phantom{xxxx}R_9$$

where $R_9$ = H, $C_{1-5}$ alkyl group $z = 1-6$ $R_1$ - Hydrogen or $C_{1-5}$ alkyl group
$R_2$ - Hydrogen or $C_{1-5}$ alkyl group
$R_3$ - Hydrogen or $C_{1-5}$ alkyl group
$R_4$ - Hydrogen or $C_{1-5}$ alkyl group
$R_5$ - Hydrogen or $C_{1-5}$ alkyl group
$R_6$ - Hydrogen or $C_{1-5}$ alkyl group
$x = 1, 2$ or $3$
$y = 1, 2$ or $3$
$x + y = 2$ to $4$ The vertical line connecting C to C of the alkylenimine group was omitted.

Signed and Sealed this

Twenty-fifth Day of January 1977

[SEAL]

Attest:

RUTH C. MASON
Attesting Officer

C. MARSHALL DANN
Commissioner of Patents and Trademarks